United States Patent [19]

Schick

[11] Patent Number: 4,999,638

[45] Date of Patent: Mar. 12, 1991

[54] APPARATUS AND METHOD FOR SYNCHRONIZING THE SIGNAL AVERAGING CLOCK OF A LORAN C. RECEIVER TO THE CLOCK OF A LORAN C. TRANSMITTER

[75] Inventor: Paul W. Schick, Madison, Wis.

[73] Assignee: LocUS, Inc., Madison, Wis.

[21] Appl. No.: 489,468

[22] Filed: Mar. 6, 1990

[51] Int. Cl.$^5$ ................................................. G01S 1/24
[52] U.S. Cl. ..................................................... 342/389
[58] Field of Search .................. 342/389, 390; 364/452

[56] References Cited

U.S. PATENT DOCUMENTS

| | | | |
|---|---|---|---|
| 3,947,849 | 3/1976 | Fehlner et al. | 342/389 |
| 4,166,275 | 8/1979 | Michaels et al. | 342/389 |
| 4,468,668 | 8/1984 | Brodeur | 342/389 |
| 4,594,594 | 6/1986 | Fukuhara | 342/389 |
| 4,814,771 | 3/1989 | Bahr et al. | 342/389 |
| 4,875,019 | 10/1989 | Monson et al. | 330/302 |

OTHER PUBLICATIONS

Final Project Report–Study of Methods for Synchronizing Remotely–Located Clocks, Sperry Report No. HG-9224-0234, Sep. 1966, p. 90.

L. Dennis Shapiro, "Time Synchronization from Loran-C", IEEE Spectrum, Aug. 1968, pp. 46, 50–51.

Dwaine Marshall, "Wild Goose Paper: Digital Averaging Loran Receiver," Megapulse, Inc., Oct 1987, This paper was presented at the Technical Symposium on the Annual Conference of the Wild Goose Association of Rockville, Maryland, and is believed to have been distributed on Oct. 22, 1987.

Primary Examiner—Gregory C. Issuing
Attorney, Agent, or Firm—Foley & Lardner

[57] ABSTRACT

Radio signals containing Loran C pulses from stations from a desired chain are amplified, filtered and ensembled averaged in an acquisition memory which is accessible by a controlling microprocessor. By staggering the ensemble averaging of the first four pulses in a station pulse group in time with respect to the last four pulses of the same pulse group, cross correlating the composite pulses formed by averaging the first four and last four pulses of the station pulse group with the help of the microprocessor provides time skew information which is used to adjust the receiver's master clock to align it with the clock of the transmitter. By varying the amount of time stagger, an ever finer resolution adjustment range is achieved. When the staggered averaging cycle times would exceed the time between successive ensemble averaging cycles without stagger, then successive ensemble averaging cycle time is employed for master clock adjustment. Cross correlation of the composite pulse formed by averaging the eight pulses gathered during the most recent unstaggered averaging cycle with the composite pulse averaged from the eight pulses of the previous average cycle can then be used to yield clock skew information. As the receiver clock becomes more closely aligned to the transmitter clock, the ensemble averaging process improves.

18 Claims, 10 Drawing Sheets

Pseudo-random noise plus LORAN-C signal after bandpass filter.

Average of eight waveforms like that shown in FIG. 2a.

Average of sixty-four waveforms like that shown in FIG. 2a.

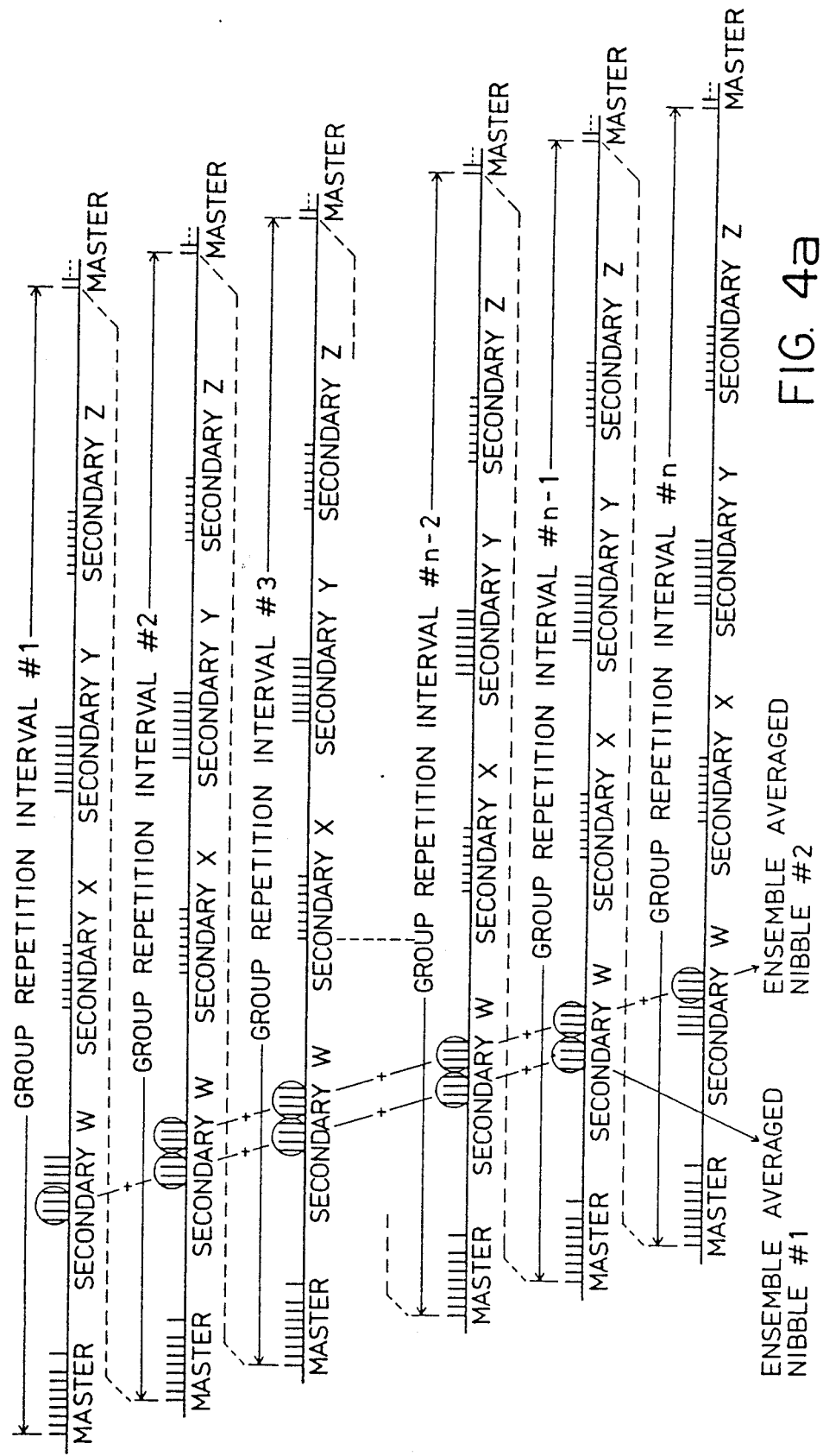

APPARATUS AND METHOD FOR SYNCHRONIZING THE SIGNAL AVERAGING CLOCK OF A LORAN C. RECEIVER TO THE CLOCK OF A LORAN C. TRANSMITTER

FIELD OF THE INVENTION

This invention pertains generally to the field of navigational systems and more particularly to Loran C navigational systems.

BACKGROUND OF THE INVENTION

Loran C is a radio navigation system operating in the low frequency portion of the radio frequency spectrum at a carrier frequency of 100 khz. The system utilizes chains which each consist of one master transmission station and two or more secondary transmission stations located at widely separated geographic locations. The master and secondary stations of each chain transmit at the same frequency but at different times. Each of the secondary stations transmits a series of eight closely and equally spaced radio frequency pulses, designated a pulse group, while the master station transmits a similar series of eight pulses followed by a delayed ninth pulse which is included for identification of the master station. Each master and secondary station continuously repeats transmission of its pulse group at a time spacing equal to the Group Repetition Interval (GRI) which is assigned to the chain to which the master or secondary station belongs. Typical GRI's range from about 40 to 100 milliseconds. The master station provides the time reference for all of the stations in its chain. Its pulse group is transmitted first, followed in time by pulse group transmission from the secondary stations in the chain in a selected order. The time of transmission of pulse groups by each of the secondary stations is selected so that there is no overlap in the reception of any of these pulse groups from the master or secondary stations by a receiver located anywhere within the nominal coverage area of the particular Loran C chain.

In the hyperbolic or range-difference mode of operation, the location or "fix" of a Loran C receiver within the coverage area of the chain is determined by synchronizing the receiver to the group repetition interval (GRI) at which the master and secondary stations of the particular chain are transmitting. The receiver calculates the difference between the time of arrival at the receiving station of the master station pulse group and each secondary station pulse group. For each pair consisting of a master station and a secondary station, the particular time difference will correspond to a hyperbolic line of position (LOP) on the surface of the earth which is a constant difference of distance between the master station and the particular secondary station, corresponding to a constant difference in the propagation time of the radio signal from the master station and the secondary stations. If the Loran C receiver can detect signals from a master and two secondary stations within a single chain, two lines of position may be determined by the receiver. The geographic point at which these two hyperbolic lines of position intersect provides an estimate of the location of the Loran C receiver.

In the circular geometric or direct-ranging mode, the location of a receiving station within the coverage area of a Loran C chain is determined by calculating the time of transmission of signals from stations. When these time differences have been calculated, the distances from the transmitting stations to the receiver can be computed. These distances correspond to radii of circles about the respective transmitting stations; the point of intersection of the three circles from the transmitting stations provides an estimate of the location of the receiver. To operate in this mode, it is generally necessary that the receiver have a highly stable and accurate master clock which can be synchronized to the pulse transmission times of the transmitters within the Loran C chain.

The radio signals available to the Loran C navigation receivers often have very low signal to noise ratios, making it difficult for the receiver to locate precise positions on each pulse waveform from the master and secondary stations with the accuracy needed to determine the exact time relationships between the stations. In addition, Loran C navigation is increasingly used in terrestrial and aeronautical applications in which the presence of various types of interfering radio frequency energy are more likely to be found than in the traditional maritime applications of Loran. These other sources of interference include power lines, commercial radio and television signals, and spurious radiation from many industrial and consumer products. Most of the interference from these types of sources are characterized by continuous wave transmission. The presence of continuous wave interference within the Loran C bandwidth may make the reception of useful Loran C navigation signal data difficult and sometimes impossible. The expansion of Loran C into non-marine applications and the subsequent construction of more Loran chains increases the potential for interference by transmission from neighboring chains, giving rise to cross rate interference (CRI), which is, of course, concentrated at the Loran C carrier frequency. In addition to the greater potential interference contaminating the Loran C signal in non-marine applications, such non-marine applications may require the receiver to make a measurement of position within a shorter time. The relatively slow movement of ships allows a relatively long period of time in which the Loran C receiver can acquire the signals and begin performing measurements. However, when Loran is being used for terrestrial navigation, and particularly for aircraft navigation, the significantly higher speeds at which the receiver is moving makes it essential that the receiver be able to rapidly acquire a signal and make a determination of position from the acquired signal information.

A Loran receiver utilizing an ensemble averaging technique to improve the signal to noise ratio of the received Loran signals is shown in the United States patent to Bahr, et al., U.S. Pat. No. 4,814,771. The Loran C signal of interest is periodically sampled to convert the continuously varying input signal to a stream of data representing the magnitude of the signal at the sample times. Each new data stream obtained during the current GRI is added to existing data in memory in a time-aligned fashion. This yields an ensemble averaged signal within the memory. In this manner, sporadic noise or non-synchronous energy, such as atmospheric noise, continous wave interference, and cross rate interference, is substantially reduced.

The effectiveness of the ensemble averaging operation is dependent on the system's ability to precisely time align successive data streams that are separated by a GRI period. A drift of 5 microseconds per longest GRI (or 50 Parts per million) between the receiver and transmitter clocks will cause Loran C pulses of alternate GRI's to be 180° apart in phase. Pulses transmitted with the same phase in successive GRI's would add destructively in the averaging process.

SUMMARY OF THE INVENTION

The present invention provides an improved method of aligning the Loran receiver's master clock with the atomic clocks of the Loran C transmitters, which is particularly suited to a Loran receiver utilizing ensemble averaging. The invention provides stabilization of the internal crystal oscillator of the receiver, which generally exhibits some instability or drift of frequency due to temperature. This is particularly true immediately after power application until the temperature of transistors and other circuitry stabilizes. The present invention requires only a voltage-controlled temperature-compensated oscillator which has enough stability that successive GRI's will not approach 180° of phase shift. The drift of this oscillator is counteracted in successive steps utilizing progressively finer drift resolution.

The receiver apparatus of the invention, typically under microprocessor control, searches the assembled data for waveforms characteristic of Loran C signals which have a reasonable minimum amplitude. The strongest pulse group is subsequently grouped into two nibbles of four pulses each. The ensemble averager is then again enabled but only the first of two nibbles is gathered for the first GRI. Both nibbles are averaged for all subsequent GRIs, except the last one, from which only the second nibble is averaged. This technique provides a stagger factor of 1 GRI.

The microprocessor measures the deviation, in radians per GRI, between the nibbles. This is done by first averaging the four pulses of each nibble into a single composite pulse to maximize the waveform's signal to noise ratio. The deviation is preferably quantified by cross correlating the two composite pulses. Although the deviation can be determined by the standard technique of measuring third zero crossing differences between composite pulses, cross correlation is a more robust method. Cross correlation further reduces noise by utilizing more of the pulse waveform information. Seventy-five or more microseconds of each composite pulse waveform, even if contaminated by skywaves, can be used for coarse adjustments. The calculated error factor is then used to adjust the voltage-controlled oscillator.

When the error factor measures less than some fairly arbitrary low value, such as 0.1 radian per GRI, the stagger factor is increased to 2 GRI's. Again, the deviation is measured but now the deviation is across 2 GRI's, hence resolution of the deviation is doubled and the error factor threshold becomes 0.05 radian per GRI. The advancement of the stagger factor is matched by an ever finer resolution of the adjustments of the oscillator. As the oscillator approaches the accuracy of the transmitter's atomic clock standard, the alignment of signals during the averaging process improves. The improvement in the resulting composite pulse quality relaxes the burden on the cross correlation effort. The portion of the composite Pulse used in the cross correlation process can be reduced, and the portion of the waveform which might contain skywave contamination can be ignored.

Typically, the stagger factor progresses in a binary sequence. When the stagger factor exceeds the number of GRI's normally integrated for navigation purposes, the stagger factor is replaced by the interval between successive batches of averaged data. Rather than averaging just the four pulses of each nibble, all eight pulses of a Loran C pulse group can be averaged to produce a single composite pulse. The pulse group averaging can now be applied to all groups of pulses, not just the strongest. The cross correlation process can also be employed to extract the intra-station time delays used for navigation purposes.

Where Doppler shift effects are significant, additional steps can be taken. Multiple pulse groups or stations can be used to compute clock time skew with respect to their transmitters, and the results can be weighted according to direction of travel of each pulse group with respect to its transmitter and averaged.

In vehicle applications that involve very high speeds, pointers into the averaging memory can be advanced or retarded periodically to further compensate for Dopple effects.

Further objects, features, and advantages of the invention will be apparent from the following detailed description when taken in conjunction with the accompanying drawings.

BRIEF DESCRIPTION OF THE DRAWINGS

In the drawings:

FIGS. 4A and 4B are detailed graphical representations of the Loran C pulse groups averaged with a stagger factor of 1.

DESCRIPTION OF THE PREFERRED EMBODIMENT

Figure 3A:
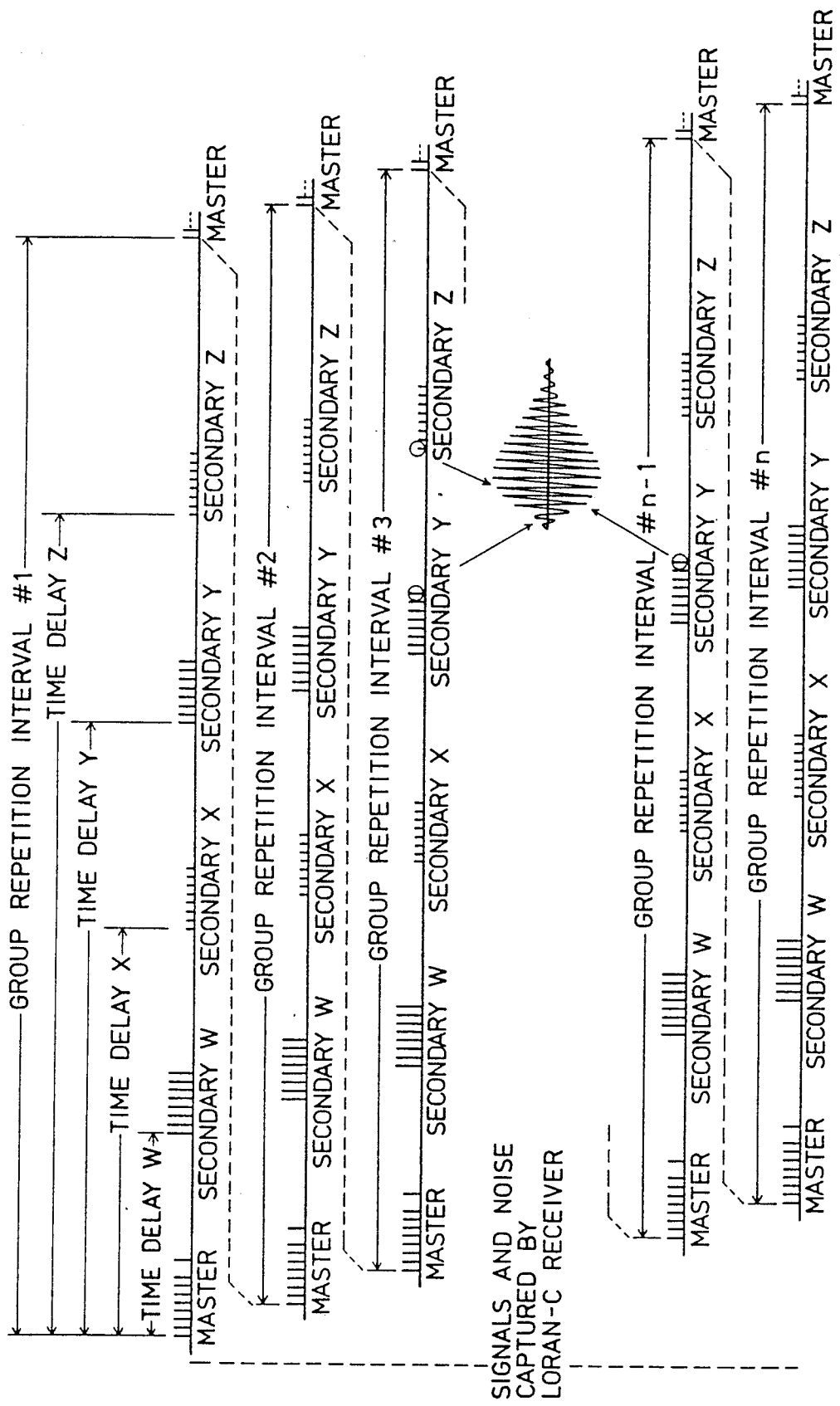
FIGS. 3A and 3B are graphical representations of the pulse groups transmitted by the master and secondary stations within a Loran C chain and the resulting ensemble averaged signal.
Figure 3B:
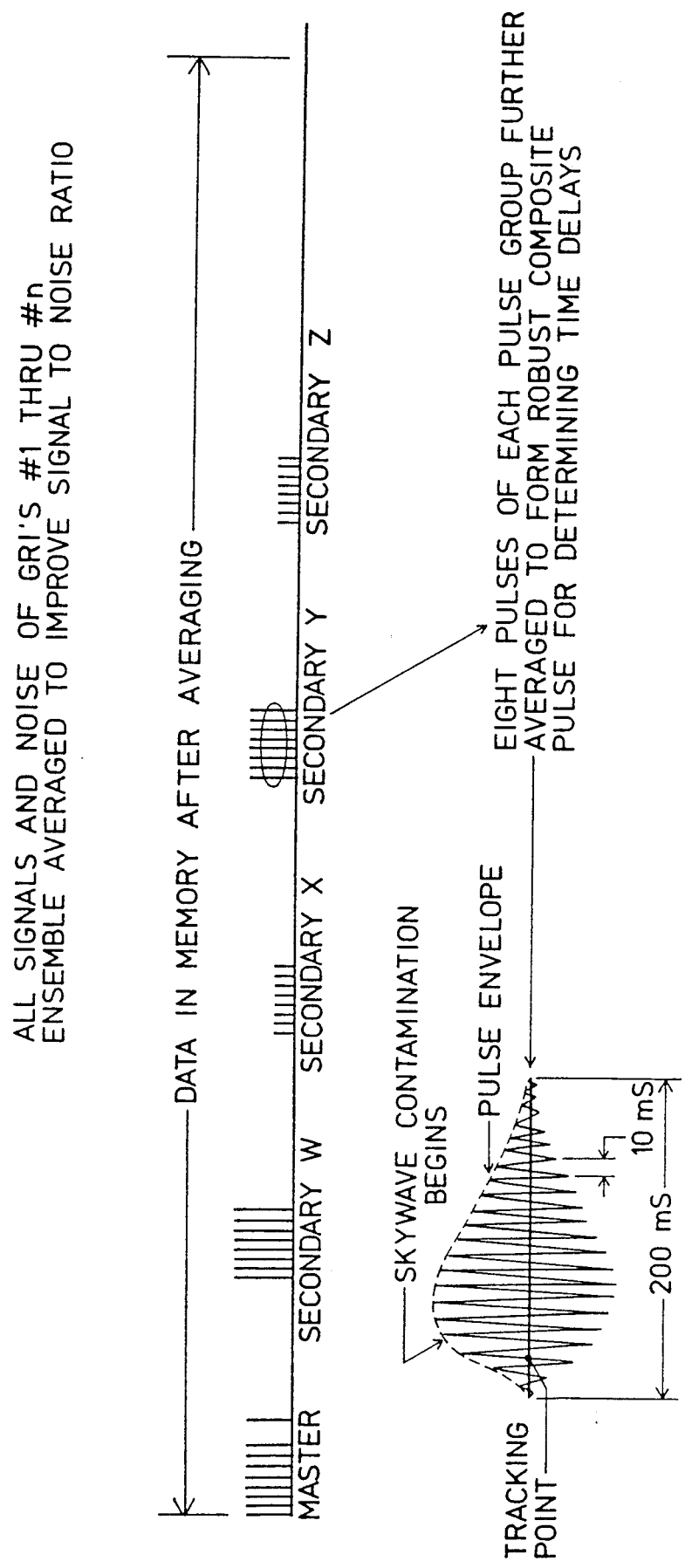

As a basis for understanding the manner in which the signal processing of the present invention provides improved performance in a Loran C receiver, it is useful to review the manner in which Loran C pulse signals are transmitted and received. All master and secondary stations transmit groups of pulses spaced at a specified group repetition interval (GRI) which is illustratively shown in FIG. 3A for a chain having a master station and three secondary stations, designated as X, Y and Z. Each pulse transmitted by the master and secondary stations has a 100 kHz carrier which is modulated to have the pulse shape also shown in FIG. 3A. FIGS. 3A and 3B show graphical representations of the pulse groups transmitted by the master and secondary stations with a Loran C chain and the resulting ensemble averaged signal. A pulse group for the master station is composed of 9 pulses while each secondary station transmits 8 pulses which are identical to the first 8 pulses of the master station. For each Loran C chain, a group repetition interval (GRI) has been assigned which is of sufficient length so that there is time for all of the pulses in the master and secondary stations to be received without overlap anywhere in the Loran C chain coverage area of that chain. In addition, the time between pulses is sufficient so that skywaves from a pulse in one group should not overlap the ground waves from subsequent pulses of a group transmitted by another station in the chain. Each of the pulses within the group are spaced exactly 1,000 microseconds apart except for the ninth pulse of the master station which is spaced exactly 2,000 microseconds after the eighth pulse. Pulse groups are separated by an emission delay that varies with each Loran C chain like the GRI. FIG. 3A illustrates the timing of the various pulses for a chain, wherein the pulses from each of the stations never overlap each other and are all received within the GRI. The time differences of arrival of the pulse group from each of the secondary stations with respect to the master station are the basic information used by the Loran receiver to calculate navigation data.

The basic assumption underlying the effective use of Loran C in the hyperbolic mode is that the time differences of arrival between the pulse group from the master station and the pulse groups from the secondary stations will vary in accordance with the location of the receiver within the coverage area of the Loran C chain. The strength of these signals received by the Loran C receiver will also vary depending on the location of the receiving equipment, which is illustrated by the different heights of the representative pulses shown in FIG. 3A.

The ninth pulse of each series of pulses from the master station serves to differentiate the master from the secondary stations but can also be used to communicate chain status through the use of "blink" codes. A sequence of "on" and "off" patterns of the ninth pulse are used to accomplish the transmission of coded information in a well-known manner to indicate faulty secondary stations in a chain. These "blink" codes are published by the U.S. Coast Guard on the Loran C navigation charts.

Several anomalies in the propagation of the Loran C signal affect the tracking of pulse relationships between stations. One such factor is interference from skywave signals, which are echos of the transmitted pulses reflected off of the ionosphere. Such skywaves may arrive at the Loran receiver at any time between 35 microseconds and 1000 microseconds after the ground wave pulse is received. In the case of a 35 microsecond delay, the skywave will overlap its own ground wave, while in the case of a 1000 microsecond delay, the skywave will overlap the ground wave of a succeeding pulse. In either case, the skywave signal distorts the apparent pulse received by the receiver, causing fading and pulse shape changes, both of which can contribute to positional errors. In some cases, the skywave may be received at a greater amplitude than the ground wave. To prevent the delayed skywave from affecting time difference measurements, the phase of the 100 kHz carrier is changed by the transmitting stations for selected pulses of each pulse train in accordance with a predetermined pattern. A Loran receiver can also make use of the phase coding of the transmitted signals to minimize the effect of phase coherent interference if proper synchronization is maintained between the transmitted pulse groups A and B in the receiver circuitry.

Figure 1:
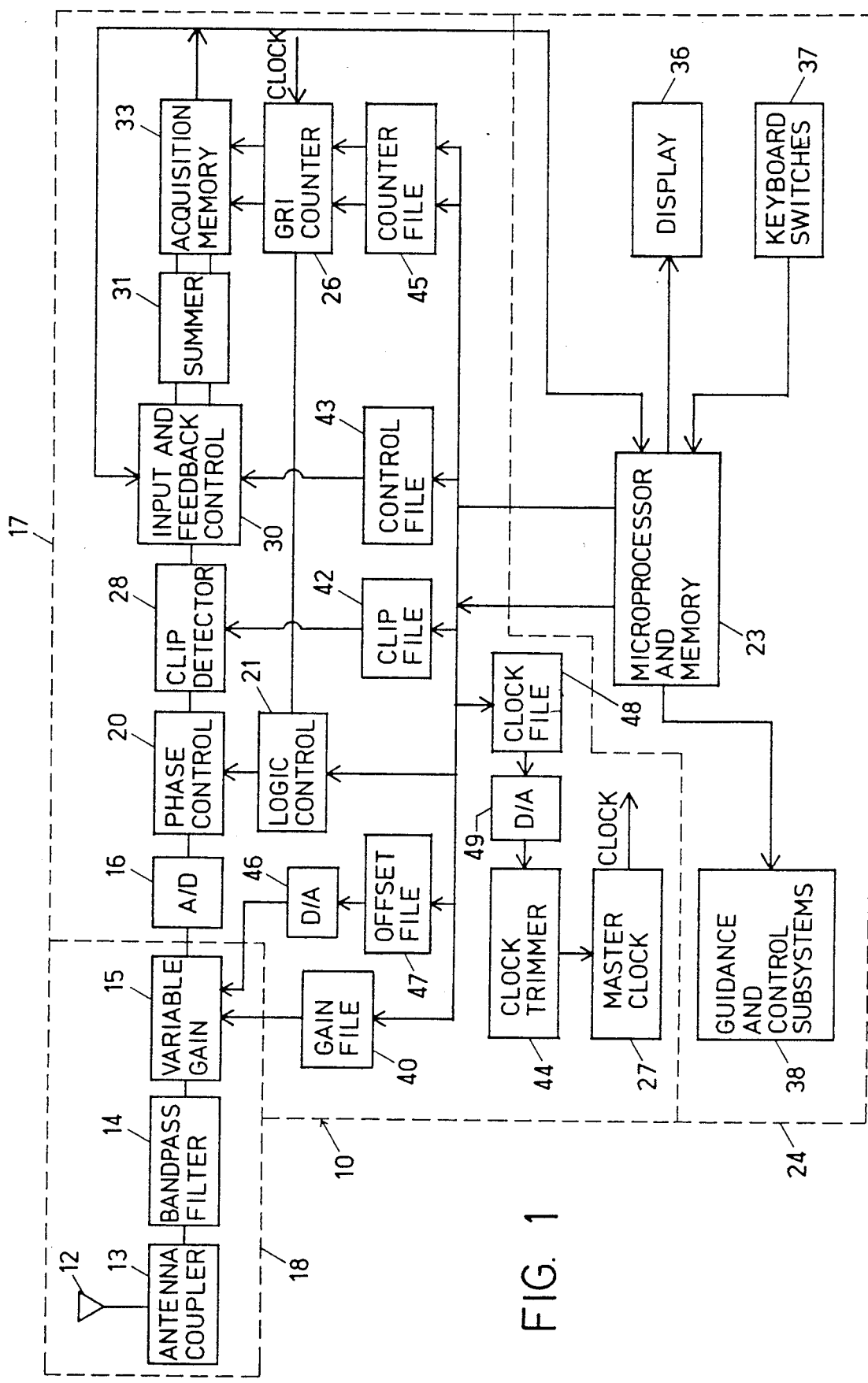
FIG. 1 is a block diagram showing the functional elements of a Loran C receiver incorporating the present invention.

In view of the general background of Loran signal processing set forth above, the signal processing receiver system of the present invention may now be described with reference to the block diagram of FIG. 1 in which the system is shown generally at 10. This system is also described in detail in the aforesaid U.S. Pat. No. 4,814,771, the disclosure of which is incorporated by reference. Radio waves are picked up by an antenna 12 and the electrical signals from the antenna are passed through an antenna coupler 13 and a band pass filter 14, which are permanently tuned to a center frequency of 100 kHz. An exemplary preferred coupler and filter section is described in U.S. Pat. No. 4,875,019, incorporated herein by reference. The signal from the band pass filter is provided to a variable gain circuit 15 which adjusts the magnitude of the signal so that the pulse group of interest is of the proper amplitude before the signal is sampled by an analog to digital converter 16. The antenna 12 and antenna coupler 13, band pass filter 14, and variable gain circuit 15 form a radio frequency unit 18. The analog to digital converter 16 forms part of a signal processing unit 17. The sample rate of the digitizer 16 is preferably relatively rapid so that it will be greater than the Nyquist frequency of the highest frequency of interest in the received signal after filtering. The signal processing unit also includes an offset file 47 and digital to analog converter 46 to adjust for any offset voltages that may appear at the input to the A/D converter. The digital data from the digitizer 16 is passed to a phase control circuit 20 which will either pass the digital data unmodified or complement the data, as appropriate, to provide constructive addition of GRI synchronous Loran C pulses within the chain of interest as explained further below. Preferably, the phase control circuit is controlled to complement the data in every other GRI. The phase code pattern is controlled by a logic control circuit 21 under control of the programming within a microprocessor 23 with associated RAM and ROM memory which forms part of the digital computer unit 24. Timing information is provided by a GRI counter 26 and indirectly by a system master clock 27. The digital data from the phase control circuit 20 are then provided to a clip detector 28 where the data is evaluated to determine whether the data is over-range. Criteria are established by the programming of the microprocessor as to the levels of signal data that will be considered over-range and the number of occurrences of over-range data that will be allowed in a given span of time. Pulse data exceeding the limits are not passed by the clip detector and are not applied to the subsequent processing circuitry. Valid data are fed from the clip detector 28 to input and feedback control logic 30 before summation of the data at an adder 31. The data from the adder are supplied to a large random access digital acquisition memory 33 which accumulates data in a number of memory locations corresponding to the number of samples taken in an entire GRI. The averaged data is accumulated in the memory over several successive GRI periods until a selected number of periods have occurred.

Figure 2A:
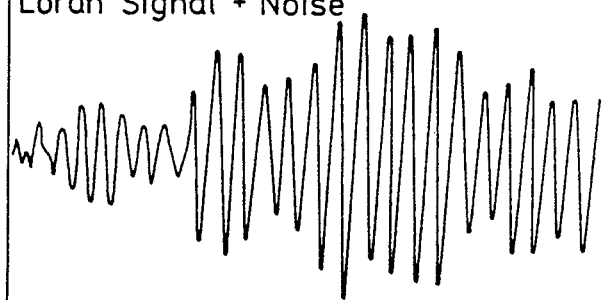
FIGS. 2a, 2b, and 2c are graphical representations of the effect of signal averaging on a signal contaminated with gaussian noise showing the initial signal, the signal after averaging over eight GRI's, and a signal after averaging over 64 GRI's.
Figure 2B:
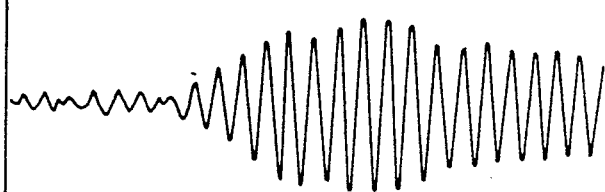
Figure 2C:
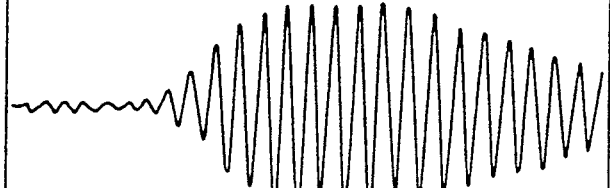

FIGS. 2a–2c show graphical representations of the effect of signal averaging on a signal contaminated with gaussian noise. FIG. 2a shows the initial signal, FIG. 2b shows the signal after averaging over eight GRI's, and FIG. 2c shows the signal after averaging over 64 GRI's.

As used herein, the "averaging" or "ensemble averaging" of data in the acquisition memory is the addition of new data to the previously acquired data in a GRI time aligned manner in such a way that the resulting value in memory reflects the value of both new and historical data. Where a relatively low resolution analog to digital converter is used, it is generally preferred that the new data be purely added to the old data so that the ensemble averaged data in the memory will have greater resolution than the output of the digitizer. For example, the digitizer may have a six bit output word while the memory may store 12 or 16 bits at each memory location.

The memory locations are assigned by the GRI counter 26, which is connected to the address lines of the memory, and the GRI counter is set to roll over back to the initial address when a selected number of samples have been assigned to memory, corresponding to a selected GRI time period. The GRI time period used by the GRI counter may change as the receiver seeks to determine the actual GRI of the chain which it is receiving.

When the specified number of samples have been averaged into the memory, the output of the memory is routed to the microprocessor 23, which can locate the standard reference point on a pulse by means of a software algorithm. The standard point of reference is usually the third zero crossing of each pulse, and is used as a basis for measuring time differences between respective pulse groups. The microprocessor utilizes this time difference information to perform the necessary calculations for conversion of the time delayed data into position information such as latitude-longitude readings.

The readings calculated by the microprocessor may be shown to the user on a display panel 36, such as a conventional LED or liquid-crystal read out, and commands from the user to the system determining what information is to be displayed and what calculations are to be persormed are entered through keyboard switches 37. The microprocessor may also pass on the calculated data to guidance and control subsystems 38 which can perform computations necessary to provide information useful to other navigational equipment, such as an autopilot.

The signal processing unit additionally include units in communication with the microprocessor which interface the microprocessor to the various subsystems which affect the signal as it is being processed. These include a gain file 40 connected to the main bus 41 of the microprocessor which acts under the control of the microprocessor to provide variable gain control signals to the gain control circuit 15. A clip file 42 similarly is controlled by the microprocessor to provide clip control signals to the clip detector 28 and a control file 43 receives input data from the microprocessor to control the input and feedback circuit control 30. The counter file 45 also receives control inputs from the microprocessor to change the GRI sample count at which the counter rolls over and cycles the acquisition memory back to its initial memory location. A clock trimmer 44 receives input from a clock file 48 and a digital to analog converter 49 to adjust the master clock 27 frequency over a narrow range to allow the microprocessor to search and optimize the timing between the local GRI counter 26 and the Loran master transmitter. The preferred functioning of the clock trimmer 44 and microprocessor 23 in accordance with the present invention is set forth below. Each of the foregoing files can function as independent hardware units under the control of the microprocessor or can be incorporated into the microprocessor itself in its associated system read only memory (ROM) (not separately shown) to control the programming operations so that the microprocessor directly controls the circuitry in the signal path.

With reference to the components of the systems set forth above, the process of aligning the receiver master clock to the atomic clock of the Loran transmitter in accord with the invention may be considered.

Figure 6A:
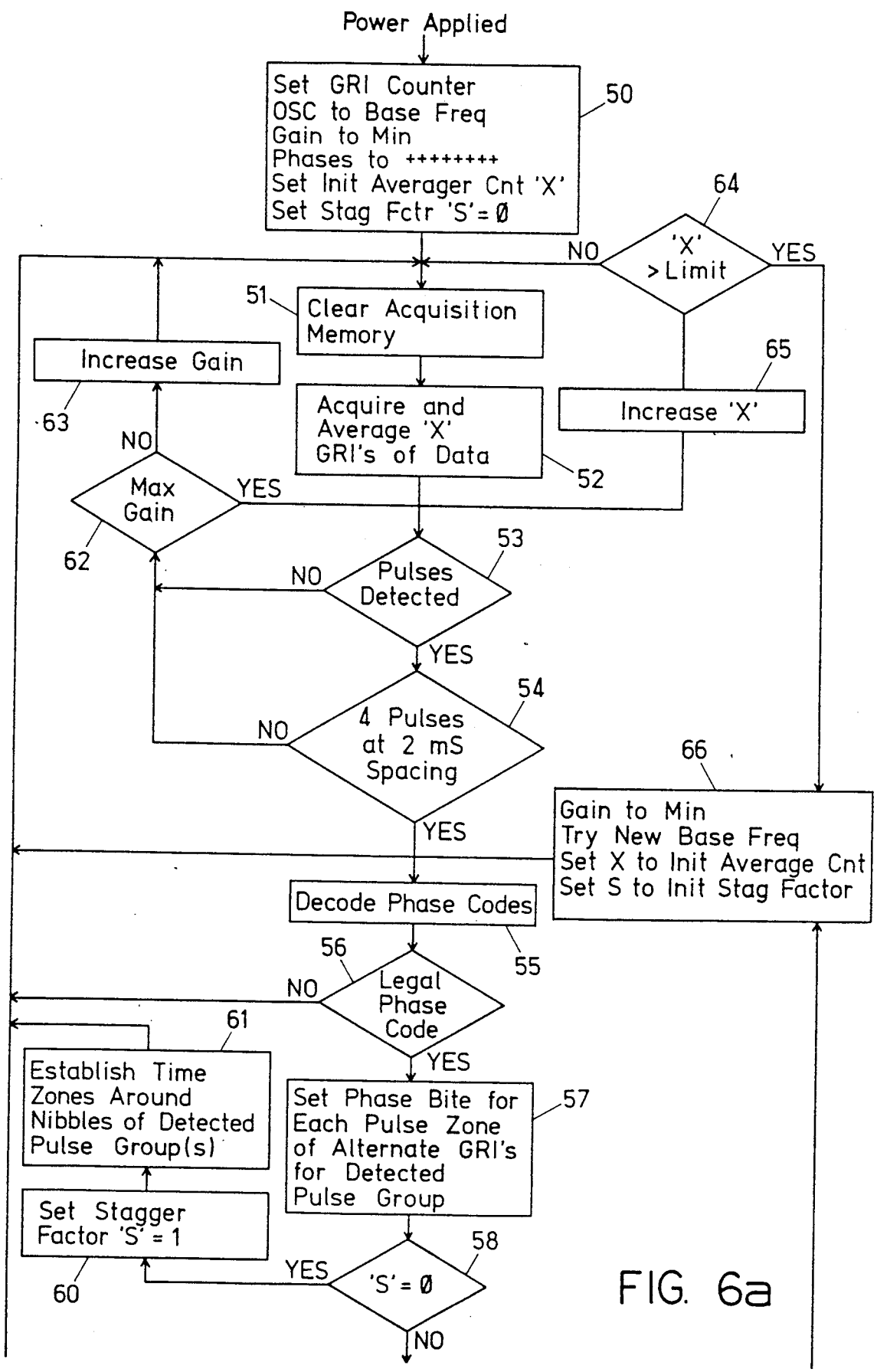
FIG. 6 is a flow diagram showing the program operating steps of the computer unit within the receiver during the synchronization-alignment phase of operation.
Figure 6B:
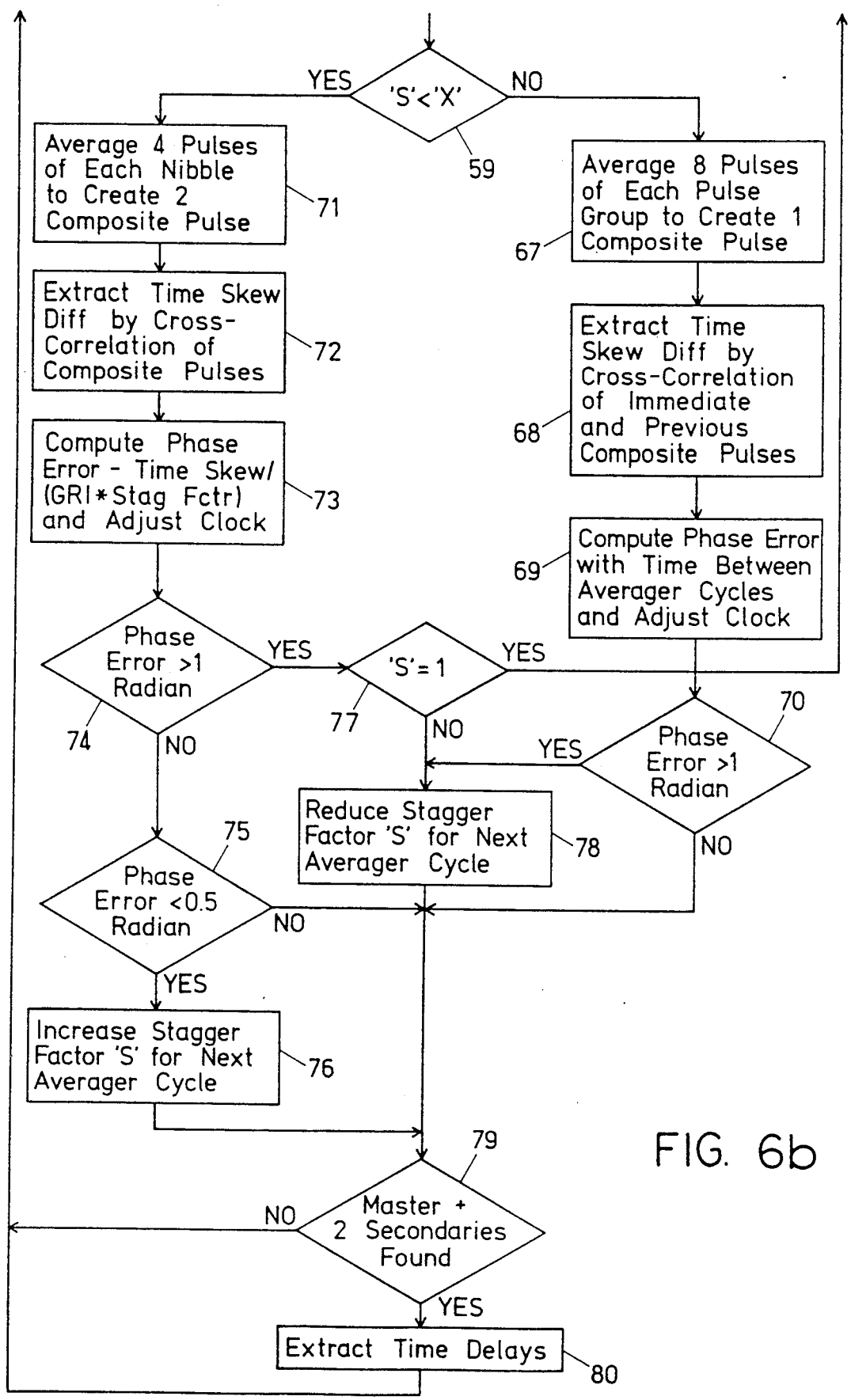

The program steps carried out by the microprocessor unit for initial acquisition and clock synchronization with the Loran C stations is illustrated by the flowchart of FIG. 6. The program begins by initially setting values for system parameters which can be provided either from default settings from the system memory or input from the front panel from the user at block 50. The initial parameters include the setting of the GRI counter, the master oscillator frequency, the starting gain of the front-end amplifiers, the number of averages needed, and the phase coding patterns. The initial number of GRI periods to be averaged is defined by a number "x" which is set to a suitable initial value, e.g., 8. The acquisition memory is then cleared (51) and "x" GRI's of data are averaged in the acquisition memory (52). The data is scanned by the microprocessor to determine the occurrence of any Loran pulses that have been received (53). The data is checked (54) to determine, if for example, at least four pulses are detected at 2 milliseconds time spacing, which, if found, allows the assumption to be made that either a master or secondary station has been detected. Four Loran pulses 2 milliseconds apart will be found from either master or secondary station groups as a result of phase coding. Transmission of alternating phases of the second, fourth, sixth and eighth pulses of each pulse group during alternate GRIs results in pulse cancellation during signal averaging.

If Loran pulses are not detected at 53 or if four pulses at 2 millisecond spacing are not detected at 54, the program then checks to determine if the gain is at maximum (62). If not, the gain is increased (63) and the program begins anew by clearing the acquisition memory at 51 and acquiring "x" GRI's of data. If the gain at 62 is found to be at a maximum, the value of "x" is increased (65) by a predetermined increment and the resulting value of "x" is checked with respect to a limit value (64). If 64 "x" has not exceeded the limit, the program cycles again to clear the acquisition memory and acquire the new number "x" of GRIs. The consequence of these program steps is that if any Loran C station is not initially detected, the gain is progressively increased until either a station is eventually detected or there is no further gain remaining. In the latter case, the number of GRI periods in which data is acquired is increased in an attempt to synchronize to a weaker station.

If both procedures fail to find any station, there may then be too much deviation between the clock rate of the receiver's system master clock 27 and the Loran chain GRI transmission period. Thus, if at the decision point (64) the increased value of "x" has exceeded the limit, the program then proceeds to block 66 to set "x" and the gain to the initial value and the base clock frequency of the system master clock 27 is set to another trial frequency which is changed by an incremental amount from the initial base clock frequency. The program then returns to block 51 to clear the acquisition memory and begin the process again. Eventually, the receiver should detect four pulses at 2 milliseconds spacing at block 54. Each pulse is then further examined for its phase and the pulse group pattern is determined (55). The phase pattern is compared to the four entry tables of known phase patterns (56). If no match is made, the pulses are dismissed as being coincidental noise and the acquisition process begins anew at block 51. When a legal pattern match is discovered, the phase patterns of the detected pulse group in alternating GRIs are programmed into the phase logic control (21). The pattern match also reveals whether the pulse group is a master or secondary station. With the gain and phase code of at least one Loran transmitter now established, the clock synchronization effort begins.

The time alignment of pulses in successive GRI's during the ensemble averaging process is directly related to the difference between the clock that dictates pulse transmission and the atomic clock standard that controls the receiver's data sampling/averaging process. To ensure that a number, say 64, of GRIs could be averaged without the Loran C pulses becoming delayed by 180° of their 100 kilohertz waveform, and thus destructively adding in the averager, a very accurate receiver clock frequency is needed. The atomic clock of the Loran transmitter is generally very accurate and stable.

For example, the required clock frequency accuracy (in parts per million)

$$= (\tfrac{1}{2} * 1/F_{Loran\ C})/(GRI's * T_{longest\ GRI})$$

$$= 5\ \text{microseconds} / 6400\ \text{milliseconds}$$

$$= 0.78\ \text{ppm}$$

where $F_{loran\ C}$ is the Loran carrier frequency, GRI's is the number of GRI's being averaged, $T_{longest\ GRI}$ is the period of the longest GRI which is likely to be encountered. Representative values for these quantities are used in the exemplary calculation above.

In the present invention, for cost and power economy reasons, this requirement is relaxed by using a receiver clock having lesser frequency accuracy and stability and then periodically pulling the receiver clock frequency into alignment with the transmitter clock. The adjustment is based on the equation above. It can be seen from the equation that since the Loran transmission frequency and the time of the longest GRI are fixed by transmission standards, only the number of GRI's can be controlled by the receiver and that a small number would relax the clock accuracy requirements. At the same time, since the signal to noise ratio is directly related to the number of GRI's that are averaged, a high number of GRI's is desired. By further averaging pulses within a pulse group (i.e, all master pulses or all secondary pulses) with the help of the microprocessor 23, the signal to noise ratio can be retained with $\tfrac{1}{8}$ the number of GRI's. But even 8 GRI's would require Loran C receiver clock accuracy of plus or minus 6.24 ppm. Time staggering the ensemble averaging of pulses within the detected pulse group reconciles the different requirements for numbers of GRI's. During the data stream of the first GRI, only the first four pulses of the pulse group are placed in acquisition memory. Some number of GRIs can now be averaged with all pulses of the pulse group being averaged. Finally, during the data stream of the last GRI to be included in this averging cycle, only the last four pulses of the pulse group are averaged. The first four pulses of the pulse group, called a nibble for convenience, are then further averaged by the microprocessor into a single lower noise composite pulse. The last four pulses are similarly used for a second composite pulse. The time relationship of transmitted pulses is precisely controlled; hence, the frequency of the receiver clock with respect to that of the transmitter clock can be determined by measuring the time difference or phase shift between the two composite pulses. Because a time difference or stagger between the composite pulses is but one GRI, a relatively large receiver clock skew (plus or minus 50 ppm) can be detected and accommodated. Even though such a large shift may cause signals averaged over a number of GRIs to begin to destructively add or even be completely destroyed and then begin to add again, the receiver clock correction process can start. Clock inaccuracy has affected the composite pulses equally, and clock error is determined by relative measurements between the composite pulses. Where the number of GRI's used in the averaging cycle together with the clock shift had caused nearly complete destruction of the Loran signals, previous steps in the initialization cycle (53, 54, 62) would have simply started the averaging effort anew with a different number of GRIs.

Figure 4B:
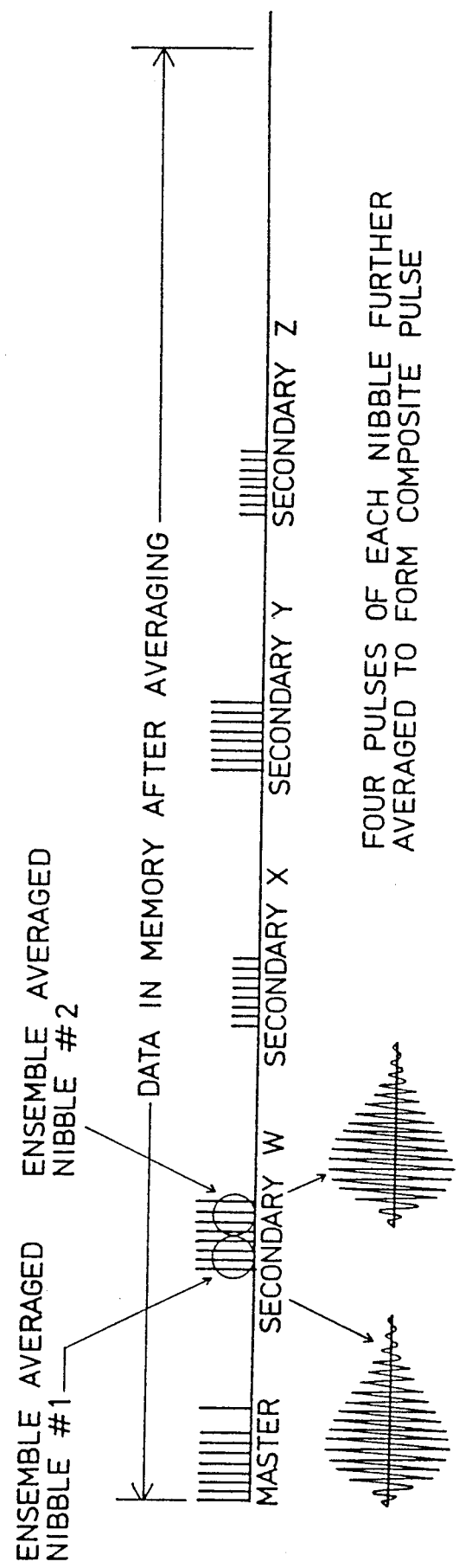

Referring again to the flow diagram of FIG. 6, with the gain and phase code of at least one Loran station established previously (57), the stagger factor is tested (58, 59). Finding no stagger factor on its initial pass, the stagger is enabled and the stagger factor S is initially set equal to 1 (60). FIGS. 4a and 4b show a detailed graphical representation of the Loran C pulse group averaged with a stagger factor of 1. Two windows of memory locations encompassing the first and last nibbles of the pulse group are established in the acquisition memory (61) and the staggered ensemble averaging process commences. The program then checks the amplitude, pulse spacing, and phase code in block 51 through 58, and if these are successfully passed, the stagger factor is tested (59) to see if it is less than the number of GRI's averaged. Being less initially, the pulses of each of the nibbles are averaged by the microprocessor to form composite pulse number one and number two (71). The timing relationship of the composite pulses is now measured, the time skew difference being extracted by cross-correlation of composite pulses (72). By Loran standards definition, the zero crossing that is 30 microseconds into the waveform is used as the reference point. Through interpolation of data points around the zero crossing points of the composite waveforms, the reference points on the two composite pulses and thus clock error can be measured directly. Such an approach, however, does not utilize all available information contained in the waveforms. Cross correlation of the waveforms, on the other hand, can employ all waveform data points that are well defined timewise with respect to the reference point. Even portions of Loran pulses that are corrupted by skywaves are usable because the contamination generally affects both nibbles equally. Just as ensemble averaging of multiple signals improves signal to noise performance, employing more of the waveform by means of cross correlation also yields a more robust solution. With the time skew of the composite pulses now known, a correction voltage can be calculated and applied to the clock voltage controlled system master clock 27 (73).

The clock correction voltage where stagger averaging is employed can be calculated as:

= phase error * k $$= \frac{(\text{time skew between composite pulses}) * k}{GRI * \text{stagger factor}}$$

where k is a constant that scales the phase correction value to the correction voltage sensitivity of the clock.

Figure 5A:
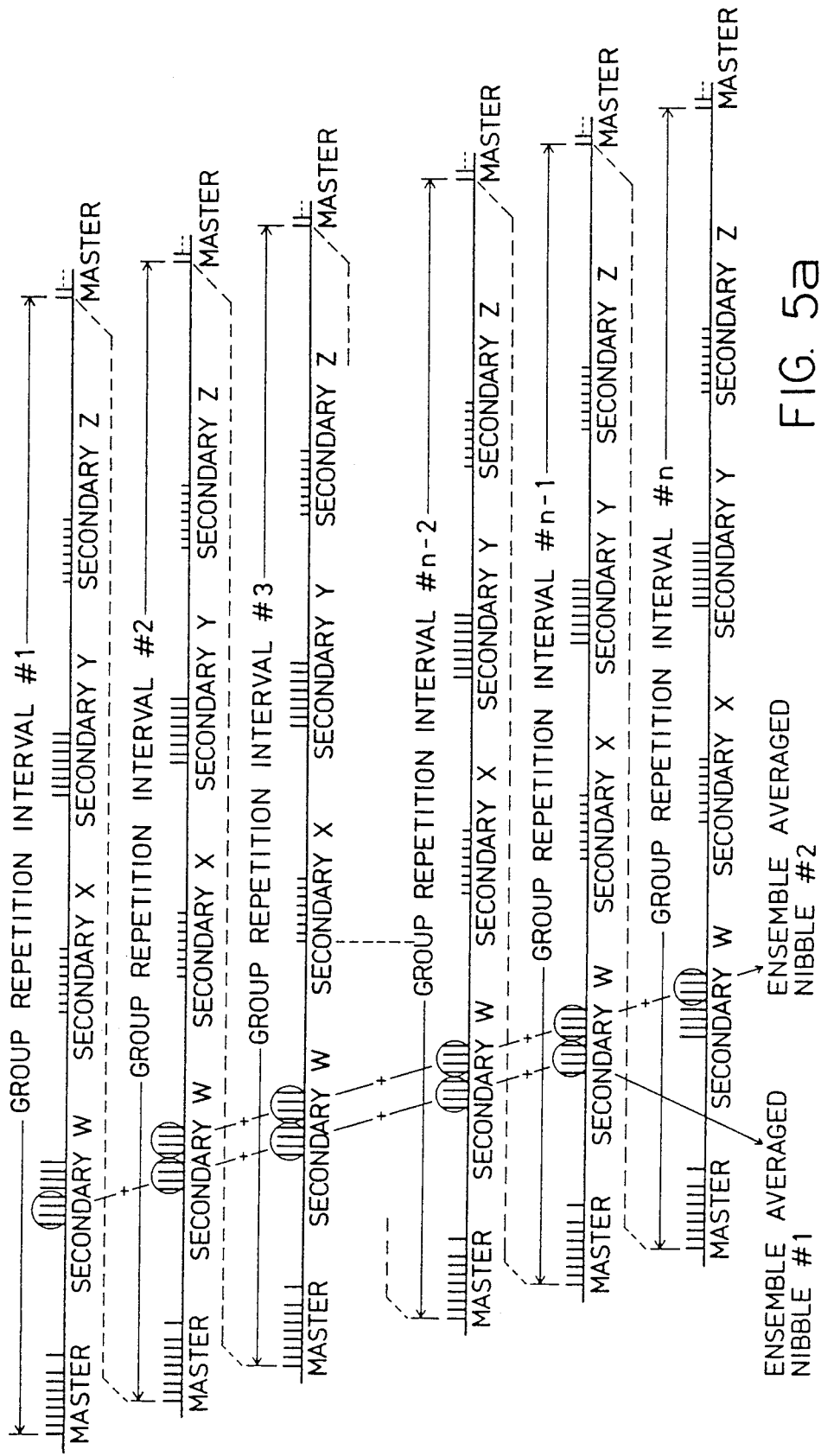
FIGS. 5A and 5B are detailed graphical representations of the Loran C pulse groups averaged with a stagger factor of 2.
Figure 5B:
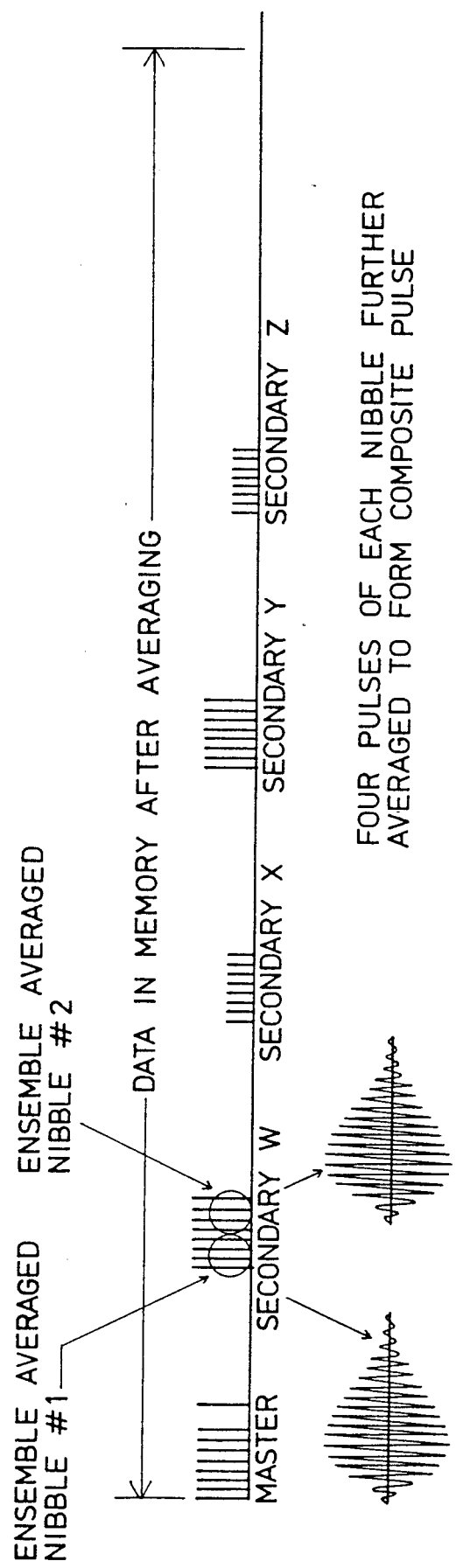

Phase error is next magnitude tested (74). If it is greater than a somewhat arbitrary but relatively large percentage—perhaps one radian for purposes of illustration—of the π radians or 180° that would cause destructive waveform addition in averaging of successive GRI's, the stagger factor is tested (77). If this variable has a value of 1, it cannot be further reduced and the starting voltage applied to the master clock 27 is changed to another predetermined starting point and the station acquisition/synchronization process is started anew. If the stagger factor is greater than 1 (typically the stagger factor is increased in binary fashion, i.e., 1,2,4,8, etc.) it is reduced by a factor of two (78). FIGS. 5A and 5B show detailed graphical representations of the Loran C pulse groups averaged with a stagger factor of two.

When the phase error is found to be less than a somewhat arbitrary small percentage of π radians—perhaps 0.5 radians for purposes of illustration—at block 75, the stagger factor is increased by a factor of two (76). The resolution of the phase error increases and the clock correction voltage applied in subsequent averager cycles decreases in direct proportion to the stagger factor. If the phase error is found to remain between the 0.5 radian and the 1 radian thresholds that affect the stagger factor, subsequent averager cycles will use the existing stagger factor again.

After the decision to increase, reduce, or leave alone the stagger factor is made, an inventory of stations is performed (79). If a master and two secondaries are found, then the process of determining time delays can begin (80). After time delay information is extracted, or if the station count is insufficient, the system recycles the averager, increasing gain outside the known station group windows, seeking additional pulse groups, and setting phase bits for newly found stations. After several passes through the station location/clock synchronization process, the stagger factor will exceed the number of GRI's employed in the ensemble averaging cycle (59). The time between averager cycles is subsequently employed for phase error measurements. The division of the pulse groups into nibbles is no longer needed and all eight pulses of each pulse group are averaged by the microprocessor to form a single composite pulse corresponding to each Loran station detected (67). The time or phase skew between the immediate and previous composite pulses of the station used for clock adjustment purposes is now measured by means of cross correlation (68). The clock correction formula shown below affects the differences between this successive averager cycle mode and the previously described staggered averaging cycle method (69):

Clock correction voltage using successive averager cycles

= phase error * k

-continued $$= \frac{(\text{phase error between composite pulses}) * k}{\text{time between averager cycles}}$$

(where k is a constant that scales the phase correction value to the correction voltage sensitivity of the clock)

Phase error is next magnitude tested (70). If phase error is greater than a somewhat arbitrary but relatively large percentage—perhaps one radian for purposes of illustration, of the π radians or 180° that would cause significant waveform phase shifts in successive ensemble averaging cycles, the stagger factor is reduced (78). A subsequent averager cycle would again employ the staggered averaging method. In this manner, the receiver can slide between coarse and fine clock correction resolution modes to respond to varying signal conditions. If the return to staggered averaging mode is not warranted, an inventory of stations is again performed (79). If a master and at least two secondaries are found, the process of measuring time delays and computing position can begin (80). In the successive averager mode, all eight pulses of each pulse group are averaged into composite pulses, further improving signal quality. After time delay information is extracted (80), or if the station count is insufficient, the system recycles the averager, increasing gain outside the known station group windows, seeking additional pulse groups, setting phase bits, etc., for newly found stations.

It should be noted that, although for illustrative purposes, each pulse group has been discussed as being divided into two nibbles consisting of the first and last four pulses, other combinations of pulses could be used to create the composite pulses used to compute clock phase error, as well. The 1st, 2nd, 7th and 8th pulses could be grouped as one nibble while the 3rd through the 6th pulses formed the other. It is also possible to employ a different or unequal number of pulses to form the composite pulses. A pulse group could be split into one 3 pulse nibble and one 5 pulse nibble. With minor changes in circuitry, it is even possible to use all eight pulses in both pulse groups. This is possible by averaging raw data into separate memory arrays or blocks of addresses. The start of averaging in the second array would simply be delayed by the stagger factor. One composite pulse needed for computation of the clock phase error would then consist of all eight pulses of a particular Loran C station in the first memory array. The second composite pulse would be assembled from all eight pulses of the same Loran C station captured in the second memory array. These and other variations are acceptable.

It is understood that the invention is not confined to the particular embodiments set forth herein as illustrative, but embraces all such modified forms thereof as come within the scope of the following claims.

What is claimed is:

1. A method of synchronizing the clock of a Loran C radio navigation receiver to the clock of a Loran C transmitter comprising the steps of:
    (a) ensemble averaging together signal data encompassing at least one pulse of a Loran C station pulse group over at least two group repetition intervals to form a first ensemble averaged pulse group;
    (b) ensemble averaging together signal data encompassing at least one pulse of the Loran C station pulse group to include all the pulses in the Loran C station pulse group not encompassed in the first ensemble averaged pulse group, over at least two group repetition intervals to form a second ensemble averaged pulse group;
(c) delaying the start of ensemble averaging of the second ensemble averaged pulse group with respect to the first ensemble averaged pulse group by at least one group repetition interval;
(d) further averaging the first ensemble averaged pulse group into a first single composite pulse;
(e) further averaging the second ensemble averaged pulse group into a second single composite pulse;
(f) extracting time skew differences between the first and second composite pulses; and
(g) computing the phase error from the time skew differences and adjusting the receiver clock frequency of a Loran receiver by an amount related to the computed phase error.

2. The method of claim 1 wherein the first ensemble averaged pulse group is formed to encompass four pulses of the Loran C station pulse group.

3. A method of acquiring and synchronizing Loran C radio navigation receiver clocks in receiver comprising the steps of:
(a) ensemble averaging together signal data into one of multiple acquisition memory arrays, encompassing at least one pulse of a Loran C station pulse group over at least two intervals to form a first ensemble averaged pulse group;
(b) ensemble averaging together signal data into a second acquisition memory array, encompassing at least one pulse of a Loran C station pulse group over at least two group repetition intervals to form a second ensemble averaged pulse group;
(c) delaying the start of ensemble averaging of the second ensemble averaged pulse group with respect to the first ensemble averaged pulse group by one or more group repetition intervals;
(d) further averaging the first ensemble averaged pulse group into a first single composite pulse;
(e) further averaging the second ensemble averaged pulse group into a second single composite pulse;
(f) extracting time skew differences between the first and second composite pulses; and
(g) computing the phase error from the time skew differences and adjusting the receiver clock frequency of a Loran receiver by an amount related to the computed phase error.

4. The method of claim 1 wherein signal data is ensemble averaged to form a first ensemble averaged pulse group encompassing eight pulses of the Loran C pulse group, and the same eight pulses are ensemble averaged to form a second ensemble averaged pulse group.

5. A method of synchronizing Loran C radio navigation signals comprising the steps of:
(a) averaging together signal data, encompassing the eight pulses of a first Loran C station pulse group, to form a first ensemble averaged pulse group;
(b) averaging together signal data, encompassing the eight pulses of a second Loran C station pulse group to form a second ensemble averaged pulse group, wherein the averaging of the second ensemble averaged pulse group is delayed in time with respect to the first ensemble averaged pulse group;
(c) further averaging the first ensemble averaged pulse group into a first single composite pulse;
(d) further averaging the second ensemble averaged pulse group into a second single composite pulse;
(e) extracting time skew differences between the first and second composite pulse; and
(f) computing the phase error from the time skew differences and adjusting the receiver clock frequency of a Loran receiver by an amount related to the computed phase error.

6. The method of claim 1 including the additional steps of magnitude testing the phase error, and increasing the stagger factor for the next averager cycle if the phase error is less than a first chosen limit and decreasing the stagger factor for the next averager cycle if the phase error is more than a second chosen limit.

7. The method of claim 3 including the additional steps of magnitude testing the phase error, and increasing the stagger factor for the next averager cycle if the phase error is less than a first chosen limit and decreasing the stagger factor for the next averager cycle if the phase error is more than a second chosen limit.

8. The method of claim 1 wherein the step of extracting time skew differences comprises executing a cross correlation algorithm.

9. The method of claim 3 wherein the step of extracting time skew differences comprises executing a cross correlation algorithm.

10. The method of claim 5 wherein the means for extracting time skew differences comprises executing a cross correlation algorithm.

11. The method of synchronizing the clock of a Loran C radio navigation receiver to the clock of a Loran C transmitter comprising the steps of:
(a) magnitude testing the phase error, and increasing the stagger factor for the next averager cycle if the phase error is less than a first chosen limit and decreasing the stagger factor for the next averager cycle if the phase error is more than a second chosen limit;
(b) comparing the magnitude of the stagger factor to the number of group repetition intervals to be averaged;
(c) if the stagger factor is not greater than the number of group repetition intervals, carrying out the steps of:
  ensemble averaging together signal data encompassing at least one pulse of a Loran C station pulse group over at least two group repetition intervals to form a first ensemble averaged pulse group;
  ensemble averaging together signal data encompassing at least one pulse of the Loran C station pulse group to include all the pulses in the Loran C station pulse group not encompassed in the first ensemble averaged pulse group, over at least two group repetition intervals to form a second ensemble averaged pulse group;
  delaying the start of ensemble averaging of the second ensemble averaged pulse group with respect to the first ensemble averaged pulse group by at least one group repetition interval;
  further averaging the first ensemble averaged pulse group into a first single composite pulse;
  further averaging the second ensemble averaged pulse group into a second single composite pulse;
  extracting time skew differences between the first and second composite pulses; and
  computing the phase error from the time skew differences and adjusting the receiver clock frequency of a Loran receiver by an amount related to the computed phase error;

(d) if the stagger factor is greater than the number of group repetition intervals, carrying out the steps of:

averaging together signal data, encompassing the eight pulses of a first Loran C station pulse group, to form a first ensemble averaged pulse group;

averaging together signal data, encompassing the eight pulses of a second Loran C station pulse group to form a second ensemble averaged pulse group, wherein the averaging of the second ensemble averaged pulse group is delayed in time with respect to the first ensemble averaged pulse group;

further averaging the first ensemble averaged pulse group into a first single composite pulse;

further averaging the second ensemble averaged pulse group into a second single composite pulse;

extracting time skew differences between the first and second composite pulse; and computing the phase error from the time skew differences and adjusting the receiver clock frequency of a Loran receiver by an amount related to the computed phase error.

12. The method of synchronizing the clock of a Loran C radio navigation receiver to the clock of a Loran C transmitter comprising the steps of:

(a) magnitude testing the phase error, and increasing the stagger factor for the next averager cycle if the phase error is less than a first chosen limit and decreasing the stagger factor for the next averager cycle if the phase error is more than a second chosen limit;

(b) comparing the magnitude of the stagger factor to the number of group repetition intervals to be averaged;

(c) if the stagger factor is not greater than the number of group repetition intervals, carrying out the steps of:

ensemble averaging together signal data into one of multiple acquisition memory arrays, encompassing at least one pulse of a Loran C station pulse group over at least two intervals to form a first ensemble averaged pulse group;

ensemble averaging together signal data into a second acquisition memory array, encompassing at least one pulse of a Loran C station pulse group over at least two group repetition intervals to form a second ensemble averaged pulse group;

delaying the start of ensemble averaging of the second ensemble averaged pulse group with respect to the first ensemble averaged pulse group by one or more group repetition intervals;

further averaging the first ensemble averaged pulse group into a first single composite pulse;

further averaging the second ensemble averaged pulse group into a second single composite pulse;

extracting time skew differences between the first and second composite pulses;

computing the phase error from the time skew differences and adusting the receiver clock frequency of a Loran receiver by an amount related to the computed phase error; and (d) if the stagger factor is greater than the number of group repetition intervals, carrying out the steps of:

averaging together signal data, encompassing the eight pulses of a first Loran C station pulse group, to form a first ensemble averaged pulse group;

averaging together signal data, encompassing the eight pulses of a second Loran C station pulse group to form a second ensemble averaged pulse group, wherein the averaging of the second ensemble averaged pulse group is delayed in time with respect to the first ensemble averaged pulse group;

further averaging the first ensemble averaged pulse group into a first single composite pulse;

further averaging the second ensemble averaged pulse group into a second single composite pulse;

extracting time skew differences between the first and second composite pulse; and computing the phase error from the time skew differences and adjusting the receiver clock frequency of a Loran receiver by an amount related to the computed phase error.

13. Apparatus for synchronizing the clock of a Loran C radio receiver to the clock of a Loran C radio transmitter comprising:

(a) means for receiving a radio signal containing the Loran C signal of interest containing Loran C pulse groups and providing an output signal corresponding thereto;

(b) controllable clock means for providing timing pulses;

(c) means for sampling the electrical signal at periodic points in time to provide data corresponding thereto;

(d) at least one acquisition memory having addressable locations for storing data;

(e) group repetition interval counter means for causing data to be stored in the acquisition memory at memory locations which are cycled every selected group repetition interval at times which are synchronized with the timing pulses from the clock means;

(f) receiver clock error detection means for determining the timing difference between the receiver clock means and the timing of pulses from the transmitter of the Loran C signal of interest and adjusting the timing of the clock means, including means for ensemble averaging over at least two group repetition intervals signal data in the acquisition memory corresponding to pulses of the Loran C pulse group used to form a first ensemble averaged pulse group, for ensemble averaging together over two or more group repetition intervals signal data in the acquisition memory corresponding to the pulses of the Loran C pulse group used to form a second ensemble averaged pulse group, where the beginning of the ensemble averaging cycle is delayed by at least one group repetition interval, for averaging the first ensemble averaged pulse group into a first single composite pulse, for averaging the second ensemble average pulse group into a second single composite pulse, for extracting the time skew differences between the first and second composite pulses, for computing the phase error from the time skew differences, and for adjusting the timing of the timing pulses from the clock means by an amount related to the computed phase error.

14. The apparatus of claim 13 further including means for testing the magnitude of the phase error, and for increasing the stagger factor for the next averaging cycle if the phase error is less than a first chosen limit and decreasing the stagger factor for the next averaging cycle if the phase error is more than a second chosen limit.

15. The apparatus of claim 13 wherein the means for extracting time skew differences executes a cross correlation algorithm.

16. The apparatus of claim 13 wherein prior to adjusting, the receiver clock error detection means tests the magnitude of the phase error and decreases the stagger factor for the next averaging cycle if the phase error exceeds a chosen limit.

17. The apparatus of claim 14 further comprising:
(a) means for comparing the magnitude of the stagger factor to the number of group repetition intervals to be averaged;
(b) means for, if the stagger factor is not greater than the number of group repetition intervals, carrying out the steps of:
ensemble averaging together signal data encompassing at least one pulse of a Loran C station pulse group over at least two group repetition intervals to form a first ensemble averaged pulse group;
ensemble averaging together signal data encompassing at least one pulse of the Loran C station pulse group to include all the pulses in the Loran C station pulse group not encompassed in the first ensemble averaged pulse group, over at least two group repetition intervals to form a second ensemble averaged pulse group;
delaying the start of ensemble averaging of the second ensemble averaged pulse group with respect to the first ensemble averaged pulse group by at least one group repetition interval;
further averaging the first ensemble averaged pulse group into a first single composite pulse;
further averaging the second ensemble averaged pulse group into a second single composite pulse;
extracting time skew differences between the first and second composite pulses; and
computing the phase error from the time skew differences and adjusting the receiver clock frequency of a Loran receiver by an amount related to the computed phase error;
(c) means for, if the stagger factor is greater than the number of group repetition intervals, carrying out the steps of:
averaging together signal data, encompassing the eight pulses of a first Loran C station pulse group, to form a first ensemble averaged pulse group;
averaging together signal data, encompassing the eight pulses of a second Loran C station pulse group to form a second ensemble averaged pulse group, wherein the averaging of the second ensemble averaged pulse group is delayed in time with respect to the first ensemble averaged pulse group;
further averaging the first ensemble averaged pulse group into a first single composite pulse;
further averaging the second ensemble averaged pulse group into a second single composite pulse;
extracting time skew differences between the first and second composite pulse; and
computing the phase error from the time skew differences and adjusting the receiver clock frequency of a Loran receiver by an amount related to the computed phase error.

18. The apparatus of claim 13 further comprising:
(a) means for comparing the magnitude of the stagger factor to the number of group repetition intervals to be averaged;
(b) means for, if the stagger factor is not greater than the number of group repetition intervals, carrying out the steps of:
ensemble averaging together signal data into one of multiple acquisition memory arrays, encompassing at least one pulse of a Loran C station pulse group over at least two intervals to form a first ensemble averaged pulse group;
ensemble averaging together signal data into a second acquisition memory array, encompassing at least one pulse of a Loran C station pulse group over at least two group repetition intervals to form a second ensemble averaged pulse group;
delaying the start of ensemble averaging of the second ensemble averaged pulse group with respect to the first ensemble averaged pulse group by one or more group repetition intervals;
further averaging the first ensemble averaged pulse group into a first single composite pulse;
further averaging the second ensemble averaged pulse group into a second single composite pulse;
extracting time skew differences between the first and second composite pulses;
computing the phase error from the time skew differences and adjusting the receiver clock frequency of a Loran receiver by an amount related to the computed phase error; and
(c) means for, if the stagger factor is greater than the number of group repetition intervals, carrying out the steps of:
averaging together signal data, encompassing the eight pulses of a first Loran C station pulse group, to form a first ensemble averaged pulse group;
averaging together signal data, encompassing the eight pulses of a second Loran C station pulse group to form a second ensemble averaged pulse group, wherein the averaging of the second ensemble averaged pulse group is delayed in time with respect to the first ensemble averaged pulse group;
further averaging the first ensemble averaged pulse group into a first single composite pulse;
further averaging the second ensemble averaged pulse group into a second single composite pulse;
extracting time skew differences between the first and second composite pulses;
computing the phase error from the time skew differences and adjusting the receiver clock frequency of a Loran receiver by an amount related to the computed phase error.

* * * * *